United States Patent [19]

Hotovy

[11] Patent Number: 4,636,421
[45] Date of Patent: Jan. 13, 1987

[54] FRAME WITH DECORATIVE TRIM STRIP
[75] Inventor: Robert Hotovy, South Bend, Ind.
[73] Assignee: Creation Windows, Inc., Elkhart, Ind.
[21] Appl. No.: 833,969
[22] Filed: Feb. 27, 1986
[51] Int. Cl.[4] ............................ B32B 3/02; B32B 7/04
[52] U.S. Cl. .................................... 428/156; 428/166;
428/188; 428/192; 428/212; 428/220
[58] Field of Search ................ 428/31, 122, 156, 166,
428/188, 192, 358, 212, 220

[56] References Cited

U.S. PATENT DOCUMENTS

| 4,291,076 | 9/1981 | Katoh | 428/31 |
| 4,394,789 | 12/1982 | Moran | 156/214 |
| 4,397,896 | 8/1983 | Moran | 428/31 |
| 4,413,027 | 11/1983 | Bildl | 428/31 |
| 4,525,408 | 6/1985 | Johansson | 428/166 |

FOREIGN PATENT DOCUMENTS 1020199 11/1977 Canada .

Primary Examiner—William J. Van Balen
Attorney, Agent, or Firm—Haight & Hofeldt

[57] ABSTRACT

A frame for mounting a window or other panel-like member in the wall of an automobile, van, truck, watercraft, and the like is formed from an elongated extrusion having a T-shaped slot adapted to receive a trim strip bearing a decorative stripe. The extrusion may be bent with the trim strip in the T-shaped slot to form corners and bends in a frame without damage to the appearance of the stripe.

14 Claims, 4 Drawing Figures

U.S. Patent   Jan. 13, 1987   4,636,421
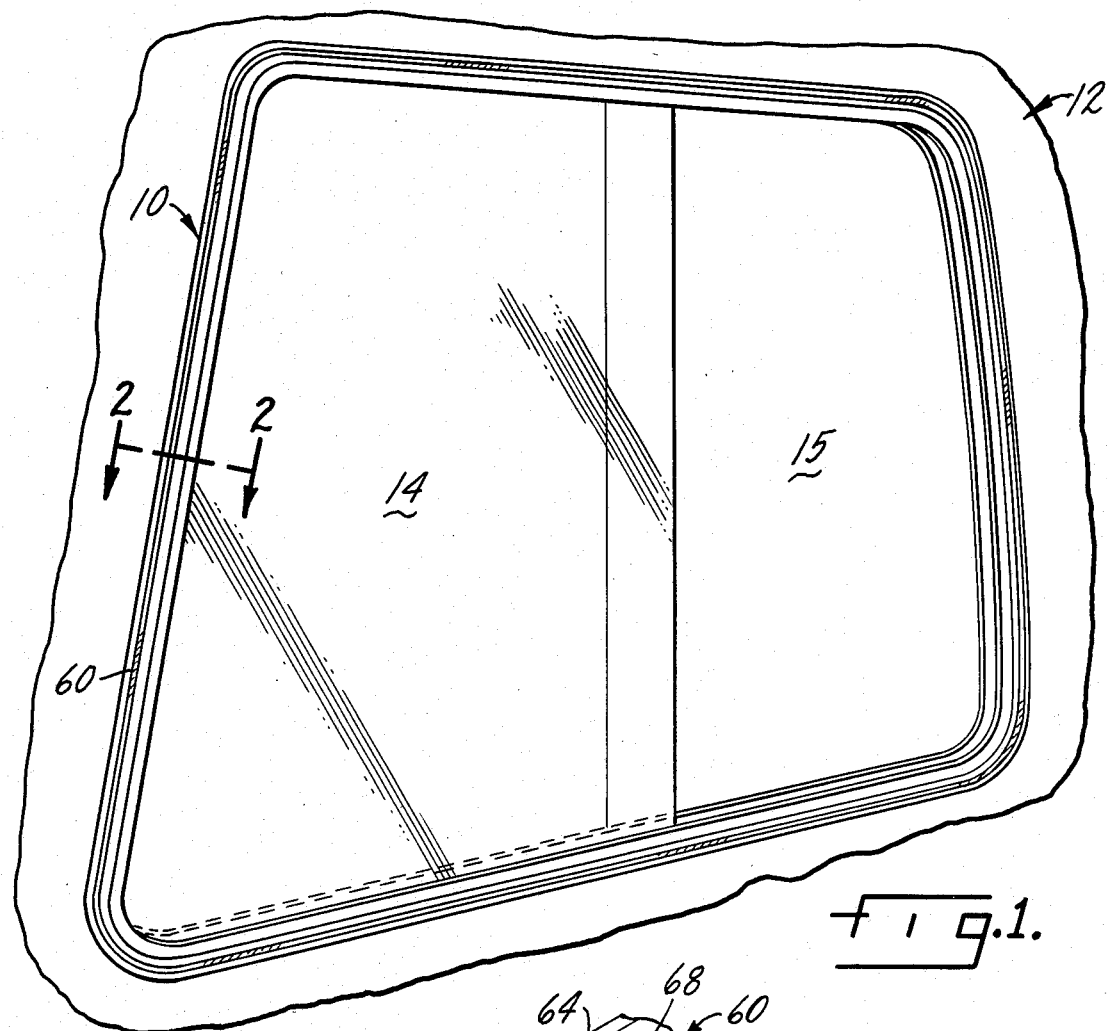
fig.1.
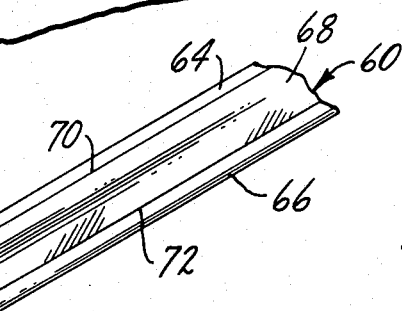
fig.3.
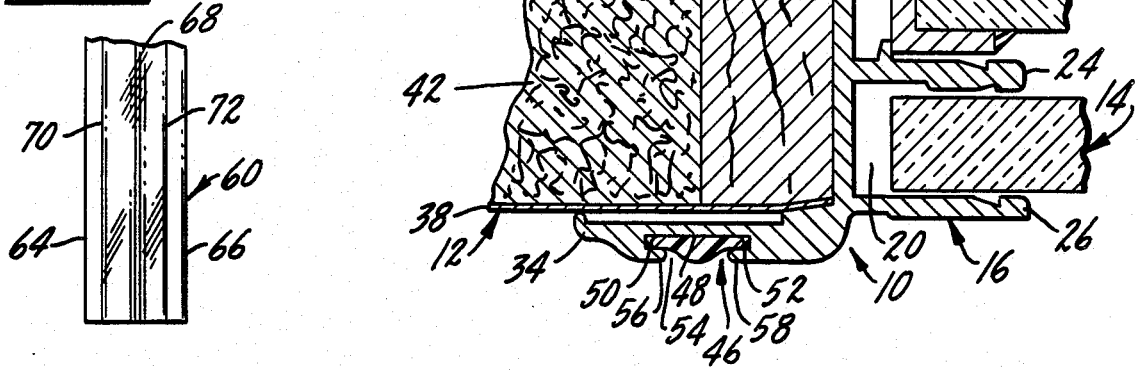
fig.4.
fig.2.

FRAME WITH DECORATIVE TRIM STRIP

BACKGROUND OF THE INVENTION

1. Field of the Invention

In mounting a window or other panel-like member in the wall of an automobile, van, truck, watercraft, and the like, it has been found desirable, from an appearance point-of-view, to provide a decorative trim strip surrounding the window or other similar panel mounted in a wall. Quite often the frame for the window or other similar panel is formed from an elongated extrusion. Typically, the extrusion is bent to a shape which closely fits in an opening in a wall. A web of the extrusion overlaps the outside surface of the wall so as to form a frame or trim surrounding the opening. The extrusion is formed with one or more ribs which project into the opening to provide channels for receiving the windows or other panel-like members which are mounted in the opening in the wall. While the outer surface of the web surrounding the opening is normally provided with a decorative finish, it has been found desirable to further enhance the appearance of the frame by providing a trim strip, of contrasting finish, on the outer surface of the web.

BACKGROUND INFORMATION

It has long been desirable to provide decorative stripes on the frame or trim surrounding an opening in a vehicle. However, the continuation of the decorative stripe in the region of curves, and particularly at corners of the frame has been a source of difficulty. The difficulty arises, wherein the trim strip providing the stripe is typically formed with a considerably greater width than height. In forming curves or corners in the frame it is necessary to bend the trim strip in the plane of its base. Such bending causes compressive forces in the strip on the side toward which the strip is bent, and tensile forces on the opposite side. The resultant compression and elongation of portions of the strip may be sufficient to cause waves to form on the compressed side, and to cause stretch marks to show on the elongated side. As a result, the trim strip may have an undesirable appearance, or even tears where curves or bends are formed.

A simple, but yet costly in terms of component cost and assembly time, way of solving the bending problem is set forth in U.S. Pat. No. 3,728,833, issued Apr. 24, 1973, to Abraham Grossman. As disclosed in this patent, a frame including a feature or molding strip surrounding an opening, is formed of separate straight members and curved or arcuate corner members. The corners, together with straight members of a desired length, are assembled to form a rectangular opening of the desired size.

U.S. Pat. No. 4,397,896, issued Aug. 9, 1983, to Eric Moran, depicts a laterally curved decorative trim strip assembly, while U.S. Pat. No. 4,394,789, issued Dec. 21, 1982, to the same inventor, is directed toward the method of forming the laterally curved strip of the prior patent. As set forth in the Moran patents, the problems created by the severe compressive and tensile stresses resulting from forming a curve portion of a trim strip is ameliorated by forming the trim strip in two portions, such that one portion may be elongated and the other compressed at a curve. After forming a curve or bend, two portions of the strip are secured to a backing member which holds them in the desired position with respect to each other. Canadian Pat. No. 1,020,199, issued Nov. 1, 1977, to Theodore Low, discloses a composite plastic trim strip and method of making the same, wherein the trim strip is formed of several strips, each of which is secured to a base plate.

It is a object of the present invention to provide the frame portion of an elongated extrusion, designed to form the frame for a window or other similar panel, with a decorative trim stripe carried by a strip, which extrusion and trim strip may be bent, such as to form a corner, without the stress of bending causing crazing, stretch marks, wrinkling, corrugation, or otherwise detracting from the appearance of the stripe.

SUMMARY OF THE INVENTION

The present invention provides a frame for mounting windows or other panels in the wall of an automobile, van, truck, watercraft or the like, which is formed of an elongated extruded channel having a T-shaped slot to receive a trim strip. The trim strip, which is formed of a plastic material, has a flat base, and is thicker in the center and thinner near the edges. The width of the flat base is much greater than the thickness of the thicker central portion. A decorative surface is provided on the thicker center section. The thinner edges are received in the arms of the T-shaped slot, with the decorative surface being exposed through the open leg of the T-shaped slot. The decorative strip is placed in the slot prior to bending the extrusion to form a desired enclosure for a window or other panel member. The trim strip is dimensioned such that taking into consideration its elasticity and the sharpest bend to which the extrusion will be subjected, the compressive and tensile stresses to which the thinner edges of the trim strip are subjected will not be sufficient to cause the decorative surface of the central portion of the trim strip to be faulted by crazing stretch marks, wrinkling, or corrugation.

BRIEF DESCRIPTION OF THE DRAWING

FIG. 1 is a plan view of a broken away wall having a frame with a decorative trim strip, in accordance with the present invention, mounted in an opening therein;

FIG. 2 is a cross-sectional view of the extrusion forming the frame, with the trim strip in place, taken along the line 22 in FIG. 1;

FIG. 3 is a perspective view of the trim strip shown in cross-section in FIG. 2; and FIG. 4 is a top plan view of the trim strip shown in FIG. 3.

DETAILED DESCRIPTION OF THE PREFERRED EMBODIMENT

Referring to FIG. 1, a frame 10, constructed in accordance with this invention, is shown mounted in a wall 12. The surface of the wall 12 as shown, may for instance, be the outside surface of a recreational vehicle. Mounted within the frame 10 are windows or panels 14 and 15. Referring to FIG. 2, a cross-section of the frame 10 reveals an extrusion 16 which is typically formed of aluminum. The extrusion 16 provides two U-shaped channels 18 and 20. The U-shaped channels are formed between three parallel legs 22, 24 and 26 which are all connected at one of their ends to a base portion 28. The channels 18 and 20 are of a suitable width to receive panel members or windows 14 and 15.

In a typical application, one or both of the windows 14 or 15 may be made movable so as to provide for opening of the window. Extending at right angles from a base portion 28 is a frame portion 34. The frame portion 34 overlies the wall in which the frame is placed. The wall is shown to include an inner support member 36 adjacent the opening, an outer surface member 38 and an inner surface member 40. Insulation 42 may be placed between the inner and outer surface members for the purpose of reducing heat and noise transfer therebetween. A tab 44 extends from the base portion 28 in the same direction as the frame portion 34, so as to provide a finished appearance between the frame and the inner surface member 40, and to assist in retaining the frame in the wall.

In accordance with this invention, the frame portion 34 is provided with an elongated T-shaped slot 46. The slot 46 has a flat base 48, and side walls 50 and 52. The width of the base 48 is considerably greater than the height of side walls 50 and 52. The center portion 54 of the outward face of the slot 46 is open. A pair of fingers 56 and 58 extending toward the center of the slot from the side walls 50 and 52 result in the slot being of a T-shape.

Referring now to FIG. 3, a trim strip 60, formed in accordance with this invention, has a flat base 62, thinner side portion 64 and 66 and a thicker center portion 68. The top surface of the trim strip 60, between the lines 70 and 72, that is, the thicker center portion 68, is provided with a decorative surface, which may, for instance, be a bright chrome or bright finish. The thinner side portions 64 and 66 are relatively loosely received under the fingers 56 and 58 in the slot 46.

Using a suitable jig, an elongated assembly including the extrusion 16 with trim strip 60 in place in the slot 46 is bent to form the necessary corners to provide a frame for a window or other panel. Abutting ends of the formed frame are secured to each other, such as by a plate which overlaps the two ends of the extrusion on the portion of the base 28 which faces away from the legs 22, 24, and 26.

The dimensions of the trim strip 60 are such that when it and the extrusion 16 are bent to form a corner, the compressive and tensile forces created in the trim strip are greatest in the thinner side portions 64 and 66. However, since the side portions 64 and 66 are thinner, they are less affected by the tensile and compressive forces. Further, if the thinner side portions 64 and 66 are, because of the forces, subject to crazing, stretch marks, wrinkling, or corrugation, the same are hidden by the fingers 56 and 58.

In a specific embodiment of this invention, the base 48 of the T-shaped slot is 343 mils in width, the sidewalls 50 and 52 are 40 mils in height, and the open center portion of the slot is 187 mils in width. A trim strip designed for use in such a slot has a flat base 62 which is 312 mils in width. The thinner side portions 64 and 66 are 20 mils in thickness, while the thicker central portion has a greatest thickness of 78 mils. The thicker central portion has an arcuate surface formed with a radius of 78 mils, with the center of the arcuate surface being located at the center of the base. The trim strip is formed of rigid exterior grade PVC. At 6 mil thick by 250 mil wide, metal film is secured to the thicker arcuate central portion to form the decorative stripe. In a preferred embodiment, the metal film has a bright chrome appearance. However, other bright finished material or decorative surfaces may also be provided.

Thus, with the applicant's invention, it is possible to provide a frame with a decorative accent strip, which may be formed from an elongated member which is bent to form the corners of the frame without the need to provide separate corner members, or to use other similarly complex construction techniques to accommodate the bends at the corners.

While in accordance with the United States Patent Statutes, a preferred embodiment of the invention has been shown and described, various changes may be made in the elongated assembly for forming a frame of this invention, without departing from the true spirit and scope of this invention.

The appended claims are intended to cover all such changes and modifications which fall within the true spirit and scope of this invention.

I claim:

1. An elongated assembly for forming a frame comprising:
    an elongated metal member having a uniform transverse cross-sectional shape, said cross-sectional shape including an elongated slot, said slot having a predetermined width and a predetermined height, said predetermined width being greater than said predetermined height, the top of said slot having an opening therein of a predetermined width which is less than the predetermined width of said slot; and
    an elongated trim strip with a uniform transverse cross-section, said cross-section having a width less than predetermined width of said slot, but greater than the predetermined width of said opening, a thicker central section and thinner end sections on either side of said central section, said thinner end sections having heights less than the predetermined height of said slot, said center section having a height greater than the predetermined height of said slot, such that it extends into said opening in the top of said slot, a portion of the surface of said trim strip being exposed in said opening, said exposed portion of the surface of said trim strip and adjacent outer surfaces of said metal member forming the top of said slot having different appearances, such that the exposed portion of the surface of said trim strip provides a decorative accent strip with respect to the adjacent outer surfaces metal member.

2. An elongated assembly for forming a frame comprising:
    an elongated metal member of a predetermined transverse cross-sectional shape, said cross-sectional shape including a slot having a base and a pair of sidewalls, said slot having a predetermined width between said sidewalls, the top of said slot being partially closed by a pair of fingers extending from the top of said sidewalls;
    a trim strip having a width less than the predetermined width of said slot, a thicker central section and thinner edge sections on either side of said central section, said thinner end sections being received in said slot under said pair of fingers, at least a portion of said thicker central section extending outwardly of said slot between said pair of fingers, a portion of the surface of said trim strip being exposed between said fingers, said exposed portion of the surface of said trim strip, and at least a portion of the exposed surface of said metal member forming said fingers having different appearances, such that the exposed portion of the surface of said trim strip provides a decorative accent strip with respect to the exposed surface of said metal member.

3. The assembly of claim 2, wherein said thicker central section of said trim strip has a cross section generally conforming to the shape of a segment of a circle, with the arcuate surface being the exposed portion of the surface of said trim strip.

4. The assembly of claim 3, wherein the maximum height of said central section of said trim strip above said base is less than the height above said base of the exposed surface of said metal member forming said fingers, such that said fingers serve to protect the surface of said central section.

5. The assembly of claim 3, wherein the arcuate surface has a radius of approximately 80 mils.

6. The assembly of claim 2, wherein said trim strip is formed of a plastic material.

7. The assembly of claim 6, wherein a decorative finish is provided on the exposed portion of the surface of said trim strip.

8. The assembly of claim 1, wherein the exposed surface of said metal member has a black finish and said exposed portion of the surface of said trim strip has a bright chrome finish.

9. The assembly of claim 1, wherein said trim strip is formed of exterior grade polyvinylchloride.

10. The assembly of claim 1, wherein a metal film is provided on the exposed portion of the surface of said trim strip.

11. The assembly of claim 1, wherein said trim strip has a width of 300 mils, said thinner end sections are 20 mils thick and the central section has a variable thickness of 20 to 80 mils.

12. The assembly of claim 11, wherein the width of said slot is 340 to 350 mils.

13. The assembly of claim 1, wherein a bright chrome finish is provided on the exposed portion of the surface of said trim strip.

14. The assembly of claim 1, wherein a bright finished material is provided on the exposed portion of the surface of said trim strip.

* * * * *